Dec. 17, 1963        W. R. WINTERS        3,114,243
AUTOMATIC SYSTEM OF AGRICULTURAL IRRIGATION
Filed July 2, 1959        2 Sheets-Sheet 1

INVENTOR.
WILLIS R. WINTERS

Dec. 17, 1963 W. R. WINTERS 3,114,243
AUTOMATIC SYSTEM OF AGRICULTURAL IRRIGATION
Filed July 2, 1959 2 Sheets-Sheet 2
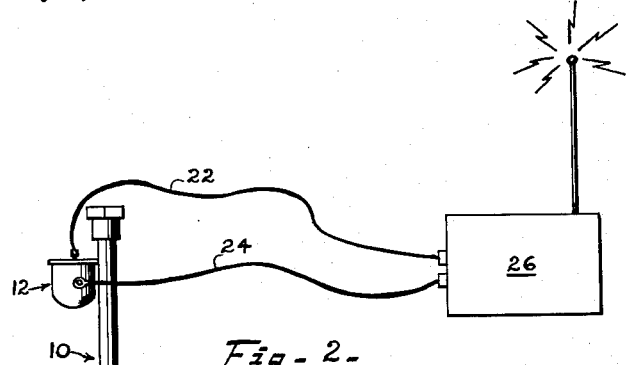
Fig-2-
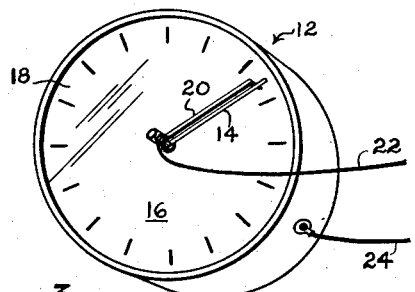
Fig-3-
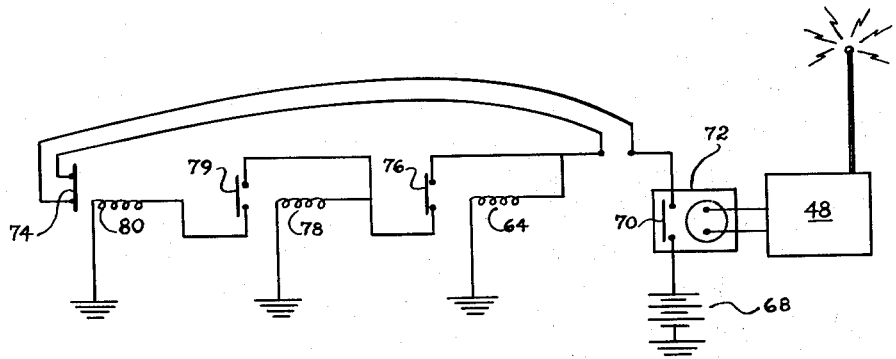
Fig-4-
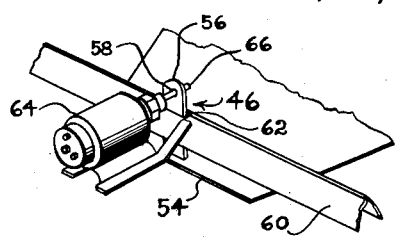
Fig-5-
INVENTOR.
WILLIS R. WINTERS
BY

United States Patent Office 3,114,243
Patented Dec. 17, 1963

3,114,243
AUTOMATIC SYSTEM OF AGRICULTURAL
IRRIGATION
Willis R. Winters, Box 8, Verhalen Rural Station, Tex.
Filed July 2, 1959, Ser. No. 824,622
2 Claims. (Cl. 61—12)

This invention pertains to agricultural irrigation and more particularly to an automatic system for controlling water on agricultural land.

This invention pertains to that particular type of irrigation where water flows by gravity along a ditch and from ports cut into the ditch onto a particular land which slopes away from the ditch. The land may have other slopes but of particularly interest is slope away from the ditch. The ditch likewise slopes so that water flows therein.

An object of this invention is to provide an automatic system which will cause the water to cease flowing upon one land when it has wet the land a specific amount and commence flowing upon another land.

Another object of this invention is to provide a system which will be portable so that the equipment may be moved from one field to another.

A further object of this invention is to provide a novel gate arrangement whereby the gates in the ditch may be opened and closed conveniently.

Still further objects are to achieve the above with a device that is sturdy, compact, durable, simple, and reliable, yet inexpensive and easy to manufacture.

The specific nature of the invention as well as other objects, uses, and advantages thereof will clearly appear from the following description and from the accompanying drawing, in which:

FIG. 2 is a schematic view of the transmitter and probe.

FIG. 3 is a perspective view of the probe's indicator dial.

FIG. 4 is a schematic view of the receiver and operating coils.

FIG. 5 is a fragmentary perspective view of a gate catch.

Figure 1:
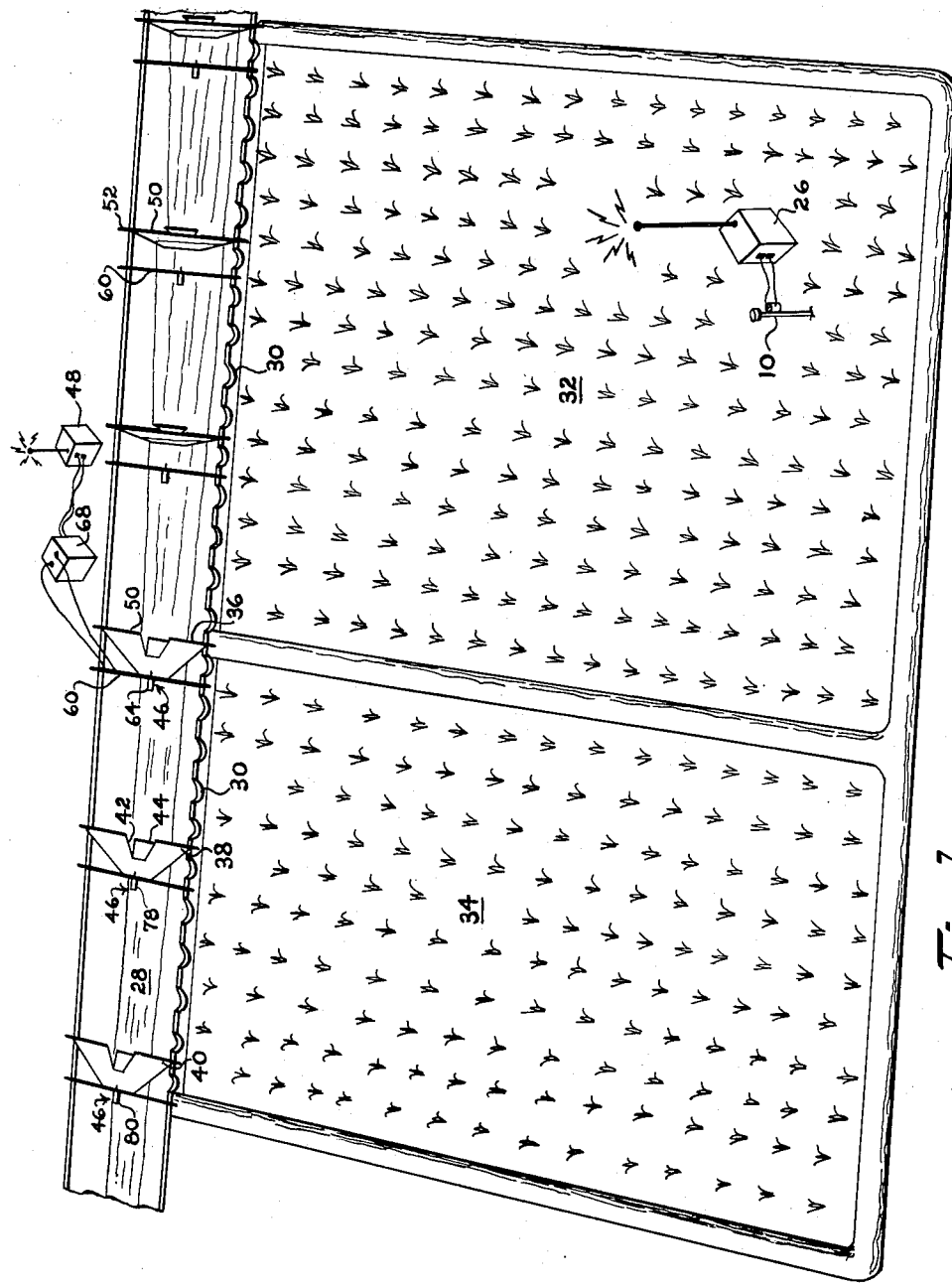
FIG. 1 is a perspective view of the invention as in operation.

As may be seen in the accompanying drawings, one embodiment of this invention includes a moisture sensing probe 10 which has a sharp point at its lower end. This portable probe is adapted to be inserted into the earth at any desirable location. Such probes are available commercially. A typical example of such a probe which I have found satisfactory in use in this combination is that made by the T. W. Prosser Company of Arlington, California and sold under the trademark Irrometer.

The probe has an indicator 12. The indicator includes a needle 14 which is pivoted for rotation about the center of a dial 16 having indices indicating the percentage of moisture at the tip of the probe. Therefore, the tip of the probe may be inserted to any desired depth and a reading of the moisture at that depth obtained. The probe as described above is as it is commercially available. I have modified this probe by providing a cover over the needle of a transparent insulating material 18, such as glass, which has a hole in the center thereof, coaxial with the pivot axis of the needle. Through this hole I have installed stop arm 20 of a conductive material which is mounted so that it intercepts the travel of the needle as the needle moves from one percentage indication to another. The stop arm is connected through an axle extending through the hole in the cover to electrically insulated conductor 22. Second conductor 24 is provided from the base of the indicator. The stop arm may be rotated manually to the desired moisture content of the land at the depth the probe is inserted into the earth. When the soil reaches this preselected moisture content, the needle will contact the stop arm thus completing the electrical circuit from conductor 22 to conductor 24.

Adjacent to the probe is radio transmitter 26 with a self-contained power source. The radio transmitter is so built and designed that the closing of the circuit of the associated conductors 22 and 24 causes the radio transmitter to radiate a specific radio frequency signal with an audio modulation of a specific frequency.

Such radio transmitters and radio receivers as will be described later are well known and commercially available. I prefer to use that type of radio which is used to control model vehicles, such as airplanes. These radio transmitters and receivers are readily available from hobby shops. They operate at such frequencies and powers that the Federal Communication Commission does not require a license for their use. They have been developed to a high degree of reliability at low cost.

The system is designed to be used with a ditch 28 which has a slope whereby the water flows by gravity through it. The ditch has several ports 30 along one bank thereof to allow the water to flow from the ditch onto lands 32 or 34. It will be noted that land 32 is the downstream land and land 34 is the upstream therefrom. Master gate 36 is at the junction of lands 32 and 34. If the master gate is open, the water will flow to the downstream land and out the ports adjacent the downstream land. If the ports 30 are sufficiently high in the bank of the ditch adjacent the upstream land, no water will flow out of them because the level of the water in the ditch will be too low. This is the normal situation when the downstream land is being watered. However, should the master gate 36 be closed, the water level in the ditch will rise until it is above the level of ports 30 of the upstream land and will cause the water to flow out upon the upstream land. If the slope of the ditch is considerable and if the upstream land has considerable width, only the ports adjacent the master gate would flow water unless additional gates 38 and 40 were provided. These additional gates do not completely block the flow of water when they are in the closed position, but merely raise the level of the water in the ditch to a predetermined level. This is accomplished by the fact that the gate is not a solid sheet, but has a partially closed port 42 therein. The port has a flap 44 therein which may be bent so that the port is more or less open. If the bottom of the additional gate is in firm contact with the ditch, the level of water in the ditch will rise at least to the bottom of the port. It will rise additionally above the bottom of the port depending upon the position of the flap and the amount of water flowing. The additional gates therefore function similar to weirs.

The gates 36, 38 and 40 are held in an open position by catch 46. When the radio receiver 48 receives a signal it causes the catch to be released, therefore allowing the gates to close.

The result of the above operation will be apparent. The farmer determines the percentage of moisture desired at the particular depth desired before the water is changed from downstream land 32 to upstream land 34. In the lower side of his field (the side away from the ditch) he inserts his probe 10 to the desired depth and sets the stop arm 20 to the desired percentage. When the land has been watered to the desired percentage, the radio transmitter is caused to transmit a signal which is received by the receiver 48 which operates the catches 46 which closes the gates 36, 38 and 40 causing the water to cease running on the downstream land and commence running on the upstream land.

Thereafter at his convenience the farmer may remove the probe and transmitter from its location in land 32 and place it in the lower portion of land 34. Then the receiver and associated controls are moved to another set of gates upstream from the land 34 so that the operation is repeated when land 34 is watered. In this manner the farmer at his convenience may set the lands to change and it is not necessary for him to be present when the water needs changing. An irrigating operation is a 24 hour continuous process. It is very desirable to change the water automatically at 3:00 A.M. rather than manually. Even if the change were in the middle of the day, if a farmer checked the land and decided that the water should be changed in about an hour from the time of the check it would be desirable if he could proceed to work elsewhere for that hour rather than remain with the irrigating operations until the actual change needed to be made. In this respect the equipment disclosed does not necessarily reduce the man-hours actually working, it makes it possible for the irrigating man-hours to be spent at the convenience of the farmer and not according to the demands of the irrigating timetable.

When the gates are closed, they form a regular trapizoid about a vertical axis, i.e. they are symmetrical about the vertical axis. At the longer upper edge 50 there is the shaft extension 52. This shaft is laid across the banks of the ditch and thus provides an axis about which the gate may rotate. Ear 56 projects from the lower edge 54. The ear has circular hole 58 therein. Stationary bar 60 is placed across the ditch. The bar has slots 62 through which extends the ear 56. Attached to bar 60 is solenoid 64 which controls bolts 66. The bolt moves axially with respect to the solenoid and through the hole 58 in ear 56. If the bolt is extended it holds the gate in the open position. However, when the bolt is removed this permits the ear to fall out of the slot and the gate fall into the closed position. The bar 60 is on the upstream side from the shaft 52 so that the flow of water helps to slam the gate firmly shut.

It will be understood that this same solenoid-bolt arrangement is provided for each of the gates 36, 38 and 40. Ordinary automobile battery 68 provides current for the solenoids. I have found it convenient to use solenoids from automobile starters. The regular bolt 66 which is provided on these does very well.

As may be seen in the schematic diagram FIG. 4, the battery is connected to a switch 70 which is actually in the receiver case. Part of the circuitry of the receiver includes relay 72 which closes the switch 70 when the receiver receives a predetermined signal of a certain frequency which has been modulated with an audio signal of a certain frequency. As discussed above, such receivers are well known and not discussed further here. The solenoid 64 is connected in series with the switch 70 and battery 68. It is the solenoid for the master gate. A circuit is completed to the battery through switch 74 which will be normally in the closed position. Switch 76 is also attached to the solenoid 64. It is connected from switch 74 through the solenoid 78 which is located on the additional gate 38. Likewise switch 79 is actuated by the movement of solenoid 78. Switch 79 is connected from switch 76 through solenoid 80 which is located on the additional gate 40. Therefore when the solenoid on the master gate operates to close the master gate, it likewise closes a switch which connects the solenoids for the additional gate across the battery thereby operating them. The switch 74 is mounted on the last additional gate so that when it falls it opens the battery circuit preventing a discharge of the battery.

An alternate arrangement would be that a switch is connected to each gate. The switch is physically mounted one-half on the bar 60 and one-half on the gate. Therefore when the gate opens, the circuit to this solenoid opens so that battery discharge through this solenoid is impossible. Thereafter when all the solenoids have opened the battery will have no circuit closed whatsoever.

It will be apparent that the embodiment shown is only exemplary and that various modifications can be made in construction, materials, and arrangement within the scope of the invention as defined in the appended claims.

I claim as my invention:

1. An irrigation system comprising the combination of:
   (a) a moisture sensing probe adapted to be placed in the earth,
   (b) the probe including:
   (c) a pivoted indicator needle which rotates responsive to the moisture content as measured by the probe,
   (d) a stationary scale with indices representing the percentage moisture as determined by the probe,
   (e) a transparent cover of electrical insulating material over the needle and scale,
   (f) a stop arm pivoted co-axially with the needle and having a stop which intercepts the travel of the needle,
   (g) a means for transmitting radio waves,
   (h) an insulated electrical conductor connecting the stop arm and the means for transmitting radio waves,
   (i) an irrigation gate adapted to be placed in an irrigation ditch,
   (j) a catch means attached to the gate for holding the gate in an open position,
   (k) a means for receiving radio waves transmitted by said means for transmitting, and
   (l) operator means connected to said catch means for releasing said catch means responsive to the reception of radio waves by the means for receiving; so that when the needle touches the stop arm it completes a circuit thus activating the means for transmitting whereby the transmission may be commenced at any desired moisture percentage.

2. An irrigation system comprising the combination of:
   (a) a moisture sensing probe adapted to be placed in the earth,
   (b) a means for transmitting radio waves responsive to the moisture content of the earth as determined by the probe,
   (c) an irrigation gate adapted to be placed in an irrigation ditch,
   (d) the gate being flat and pivoted about one edge,
   (e) a stationary bar adjacent to the gate,
   (f) a catch means attached to the gate for holding the gate in an open position, said catch means including:
   (g) an ear projecting from the gate through a slot in the stationary bar,
   (h) means for receiving radio waves transmitted by said means for transmitting,
   (i) an operator means for releasing the catch means responsive to reception of radio waves by the means for receiving,
   (j) said operator means including an electrical solenoid mounted on the bar,
   (k) the solenoid being connected electrically to the means for receiving, (l) a bolt in the solenoid extending through a hole in the ear; so that when the solenoid is activated it withdraws the bolt from the ear thus allowing the gate to close.

References Cited in the file of this patent

UNITED STATES PATENTS

| | | |
|---|---|---|
| 1,018,251 | McKee | Feb. 20, 1912 |
| 1,529,065 | Hammond | Mar. 10, 1925 |
| 1,865,769 | Lanz | July 5, 1932 |
| 2,578,981 | Parker | Dec. 18, 1951 |
| 2,584,364 | Osborn | Feb. 5, 1952 |
| 2,696,713 | Bentrup | Dec. 14, 1954 |
| 2,732,686 | Melin | Jan. 31, 1956 |
| 2,834,201 | Ohlheiser | May 13, 1958 |
| 2,878,671 | Prosser | Mar. 24, 1959 |
| 2,906,952 | Horecky | Sept. 29, 1959 |